(12) United States Patent
Adelerhof (10) Patent No.: US 6,559,638 B1
(45) Date of Patent: *May 6, 2003

(54) MAGNETIC POSITIONING DETECTOR USING FIELD DIRECTION AS PRIMARY DETECTING MEANS

(75) Inventor: Derk J. Adelerhof, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,367

(22) PCT Filed: Jun. 17, 1999

(86) PCT No.: PCT/IB99/01134
§ 371 (c)(1),
(2), (4) Date: Feb. 8, 2000

(87) PCT Pub. No.: WO99/67651
PCT Pub. Date: Dec. 29, 1999

(30) Foreign Application Priority Data

Jun. 22, 1998 (EP) .............................................. 98202064

(51) Int. Cl.⁷ .............................. G01B 7/30; G01D 5/12; G01P 3/42
(52) U.S. Cl. ................................ 324/207.21; 324/207.25
(58) Field of Search .................... 324/207.2, 207.21, 324/207.25, 173, 174, 251, 252; 123/406.58, 617

(56) References Cited

U.S. PATENT DOCUMENTS

| | | | | |
|---|---|---|---|---|
| 4,086,533 A | * | 4/1978 | Ricouard et al. | 324/207.2 |
| 4,875,008 A | * | 10/1989 | Lorenzen | 324/207.25 X |
| 5,341,097 A | * | 8/1994 | Wu | 324/207.2 |
| 5,444,370 A | | 8/1995 | Wu | 324/207.2 |
| 5,637,995 A | * | 6/1997 | Izawa et al. | 324/174 |
| 5,668,471 A | | 9/1997 | Lequesne et al. | 324/207.21 |
| 6,020,736 A | * | 2/2000 | Aoyama et al. | 324/207.21 |
| 6,104,186 A | * | 8/2000 | Yamada et al. | 324/207.21 |

* cited by examiner

*Primary Examiner*—Gerard R. Strecker
(74) *Attorney, Agent, or Firm*—Aaron Waxler (57) ABSTRACT

A magnetic position detector includes a soft magnetic target wheel, a magnetic sensor and a permanent magnet. The invention includes magnetoresistive sensors in several geometrical configurations of the target wheel, the sensor and the magnet. All configurations result in a big change of direction of the magnetic field at the location of the sensor as a result of a rotation of the target wheel. The configurations have in common that the direction of the magnetic field at the location of the sensor, as generated by the permanent magnet, is predominantly in the plane of the sensor surface, both when the sensor is next to a slot and next to a tooth of the target wheel, the surface of the sensor being substantially normal to the direction of movement of the target wheel.

8 Claims, 9 Drawing Sheets

MAGNETIC POSITIONING DETECTOR USING FIELD DIRECTION AS PRIMARY DETECTING MEANS

BACKGROUND OF THE INVENTION

The invention relates to a magnetic position detector, and more particularly to a magnetic angular or linear position detector which utilises a moveable target track comprising magnetic data of a first kind and a second kind in conjuction with a magnetically sensitive component arranged with a biasing magnet.

Magnetic position detectors are widely used in dirty environments like automobiles since they are insensitive to dust and other contaminations. A position detector typically consists of a soft magnetic target, a magnetic sensor, and a permanent magnet. The target has a tooth/slot pattern which modifies the magnetic field pattern of the permanent magnet while it is moved along the magnet. The sensor is usually in between the magnet and the target and can detect whether the magnet is facing a slot or a tooth by the difference in magnetic field strength. The sensor is not in contact with the target, which prevents the detector from wear.

Unfortunately, the magnetic field strength detected by the sensor is not only a function of the tooth/slot pattern, but also of the gap between the sensor/magnet pair and the soft-magnetic target. This causes a shift in the detected position of a tooth edge if the gap changes. A conventional Hall crank shaft sensor, in front of a rotating soft magnetic target wheel, for gaps ranging from 0.1 up to 2.4 mm e.g. shows a strong change in output with the length of the gap. In practice, this change in output induces a shift in the detected position of a tooth edge of about 1–2 degrees.

An elegant way to circumvent this gap dependence is the use of two complementary targets (U.S. Pat. No. 5,444,370) in combination with one or two sensors (one for each target), where the sensor can measure the field strength. A non-magnetic spacing between the two complementary targets makes the set-up less sensitive to tolerances in the axial direction (U.S. Pat. No. 5,668,471).

Magnetoresistive sensors, like AMR sensors, GMR (giant magnetoresistive effect) sensors, and spin-tunnel junction sensors have the advantage over Hall sensors that they can be used to measure the direction of the magnetic field generated by the permanent magnet, whereas the Hall sensors can only measure the field strength. The strength of a magnet is dependent on its temperature, which can easily vary over more than 150 degrees in automotive applications. Moreover, AMR and GMR sensors have an in-plane sensitivity, whereas Hall sensors measure field components perpendicular to the thin-film structure.

SUMMARY OF THE INVENTION

It is an object of the invention to provide magnetoresistive sensor configurations which benefit maximally from the advantages of these sensors, so as to produce an intrinsically higher spatial resolution. The invention relates to a magnetic position detector. The claimed detector arrangement is such that the output signal of the sensor is mainly determined by the direction of the sensed field and practically not by the strength of the sensed field. A first magnetic datum causes the magnetic field flux to flow in a first, e.g. straight, direction through the sensor, and a second magnetic datum causes the flux to flow in a second direction, which is e.g. bended relative to the first direction.

Several embodiments are presented, some of which also show less influence of axial gap variations. The proposed configurations have in common:

1. The direction of the magnetic field at the location of the sensor, as generated by the bias magnet, is predominantly in the plane of the sensor surface both when the sensor is next to a magnetic datum of a first kind, e.g. a non ferromagnetic segment (slot) and next to a magnetic datum of a second kind, e.g. a ferromagnetic segment (tooth) of the target track.
2. The sensor detects the change in the direction of the magnetic field emanating from the magnet caused by the tooth-slot pattern of the soft magnetic track on the target wheel.
3. Preferably, the surface of the (thin film) sensor is perpendicular to the direction of movement of the magnetic target, in order to get the maximum spatial resolution.
4. Preferably, the sensor is in or near the saturation mode, both when the sensor is facing a slot and when it is facing a tooth.

BRIEF DESCRIPTION OF THE DRAWINGS

These and other embodiments will be described with reference to the drawings, in which

FIGS. 2, 4, 5 and 6 show output signals in Volts produced by the sensors of the inventive magnetic detector arrangements as a function of the rotation angle x of the target wheel.

DETAILED DESCRIPTION OF THE PREFERRED EMBODIMENTS $1^{st}$ Embodiment (In the Figures the Same Reference Numerals Are Used for the Same Elements)

Figure 1:
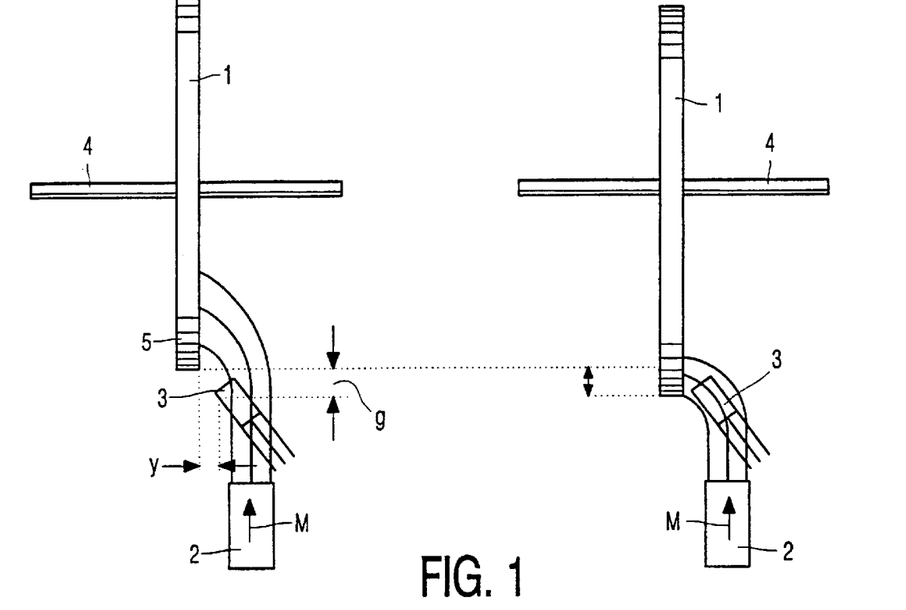
FIGS. 1, 3, 6, 7, 8 and 9 show various embodiments of the inventive magnetic detector arrangement.
Figure 2:
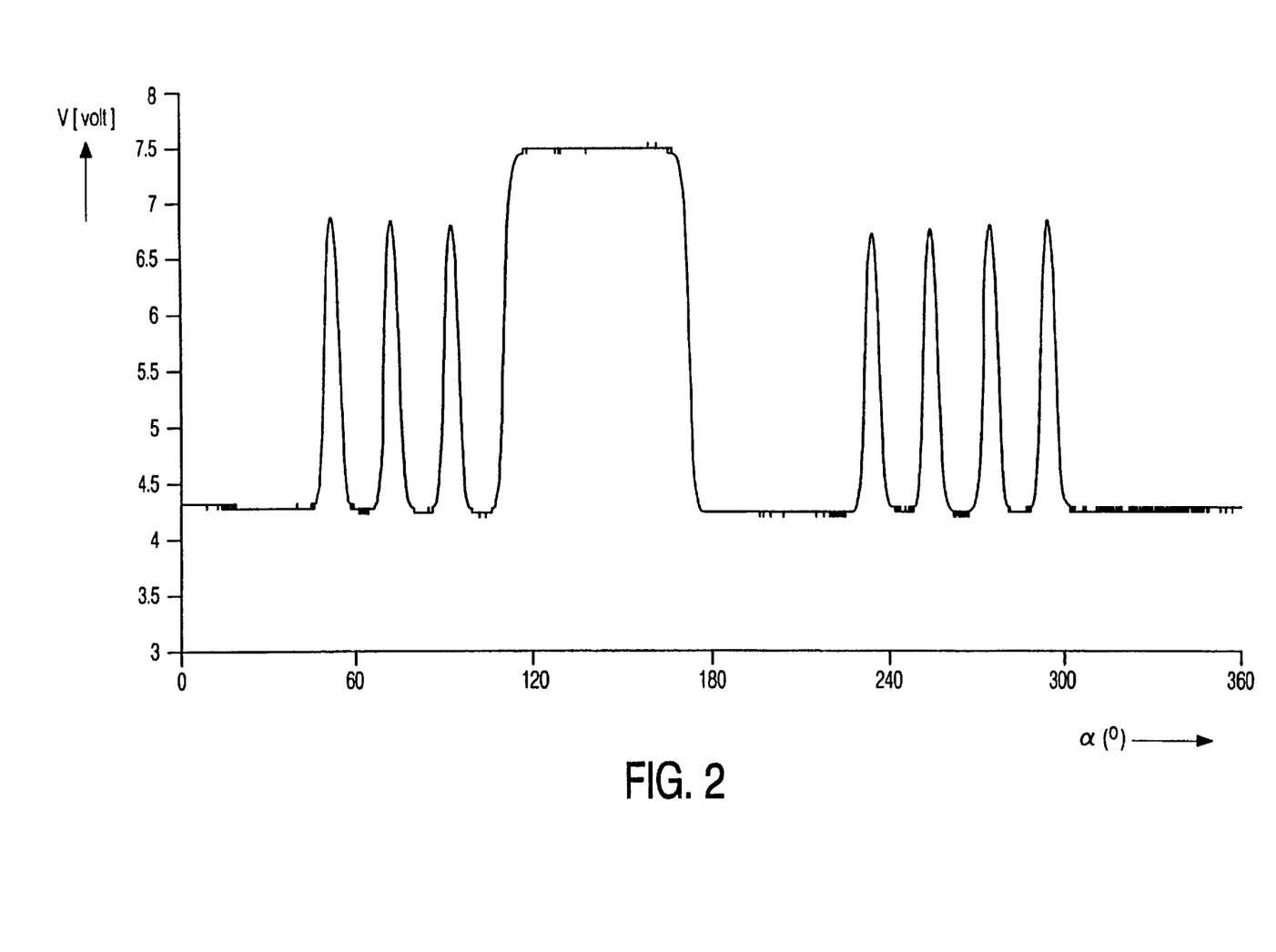

An (AMR) sensor (3) is located on the side of a soft magnetic target wheel (1), provided with a tooth-slot pattern (5) along its circumference, in this embodiment under an angle of about 45° with the plane of the target wheel, proximate to the tooth/slot pattern, as indicated in FIG. 1 left. A bias magnet (2) is positioned behind the sensor (3) as seen from the shaft (4) of the target wheel. The magnetic field emanating from the magnet passes the sensor either in the direction towards the shaft, if the sensor is next to a slot, FIG. 1 left, or it is bended towards the target wheel if the sensor is next to a tooth, FIG. 1 right. The change in field direction is sensed by the sensor as can be seen in FIG. 2 (with a KMZ10B AMR Wheatstone bridge sensor, from Philips Semiconductors Hamburg, the voltage indicated being the voltage after amplification). M indicates the direction of the magnetization bias magnet (2).

Figure 3:
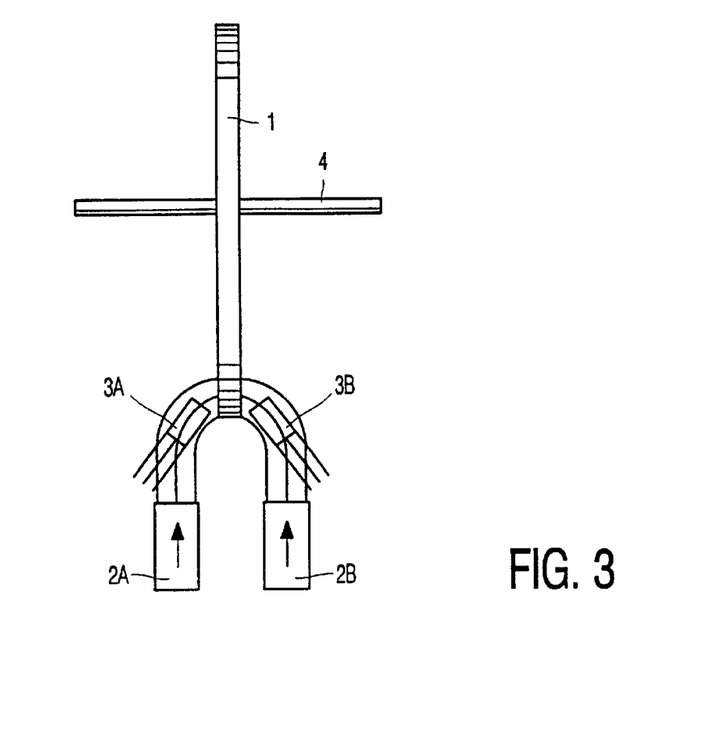

$2^{nd}$ Embodiment (FIG. 3)

Figure 4:
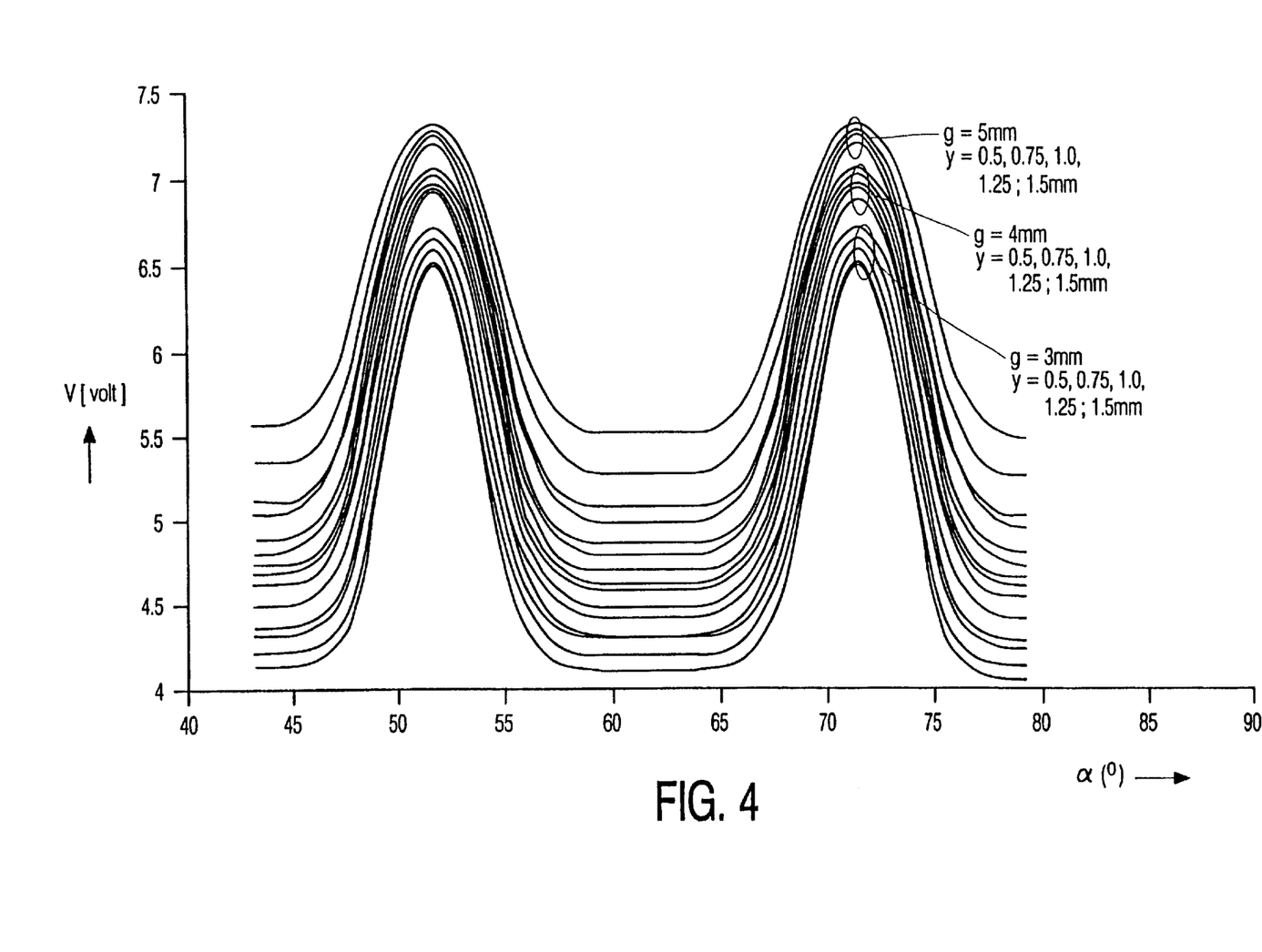
Figure 5:
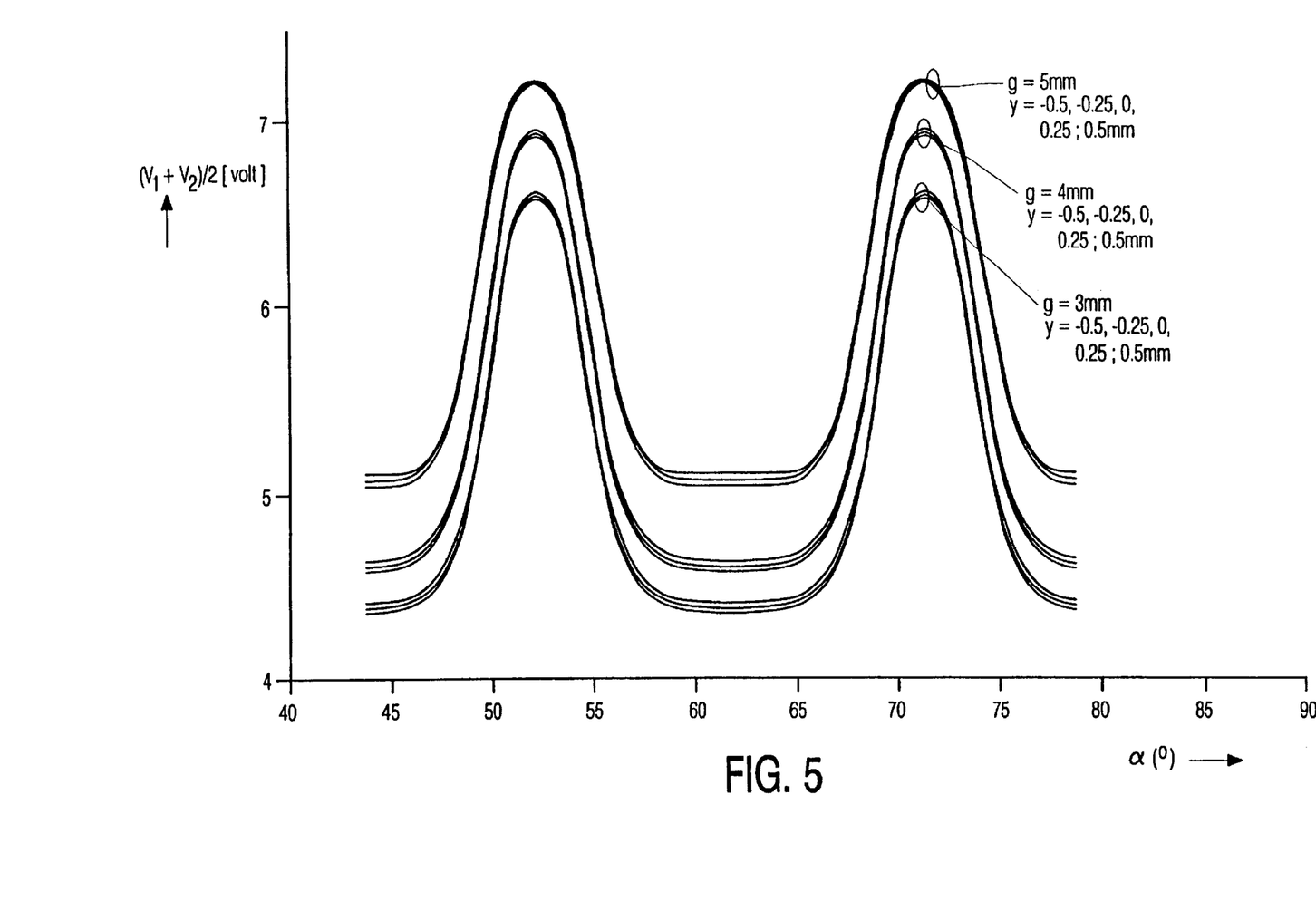

The basic idea is the same as in the first embodiment, but now two identical magnetoresistive (AMR or GMR) sensors (3A and 3B) are used, positioned on opposite sides of the target (see FIG. 3). Each sensor can be biased by its own magnet (2A, 2B), or one (larger) magnet can be used to bias both sensors. The output signal as function of the rotation angle is shown in FIG. 4. The (non)-influence of the axial shift is indicated in FIG. 5. The added output of the two sensors is less sensitive to axial tolerances in the position of the wheel, as can be seen when comparing FIG. 4 with FIG. 5. In these Figures the axial displacement relative to the centered position with respect to the target ("axial shift") is denoted as "y". For crank shaft sensors, this is an important improvement since the axial tolerance is typically 2 or 3 mm, whereas the radial tolerance is only about 1 mm. Gap measure is denoted as "g".

Figure 6:
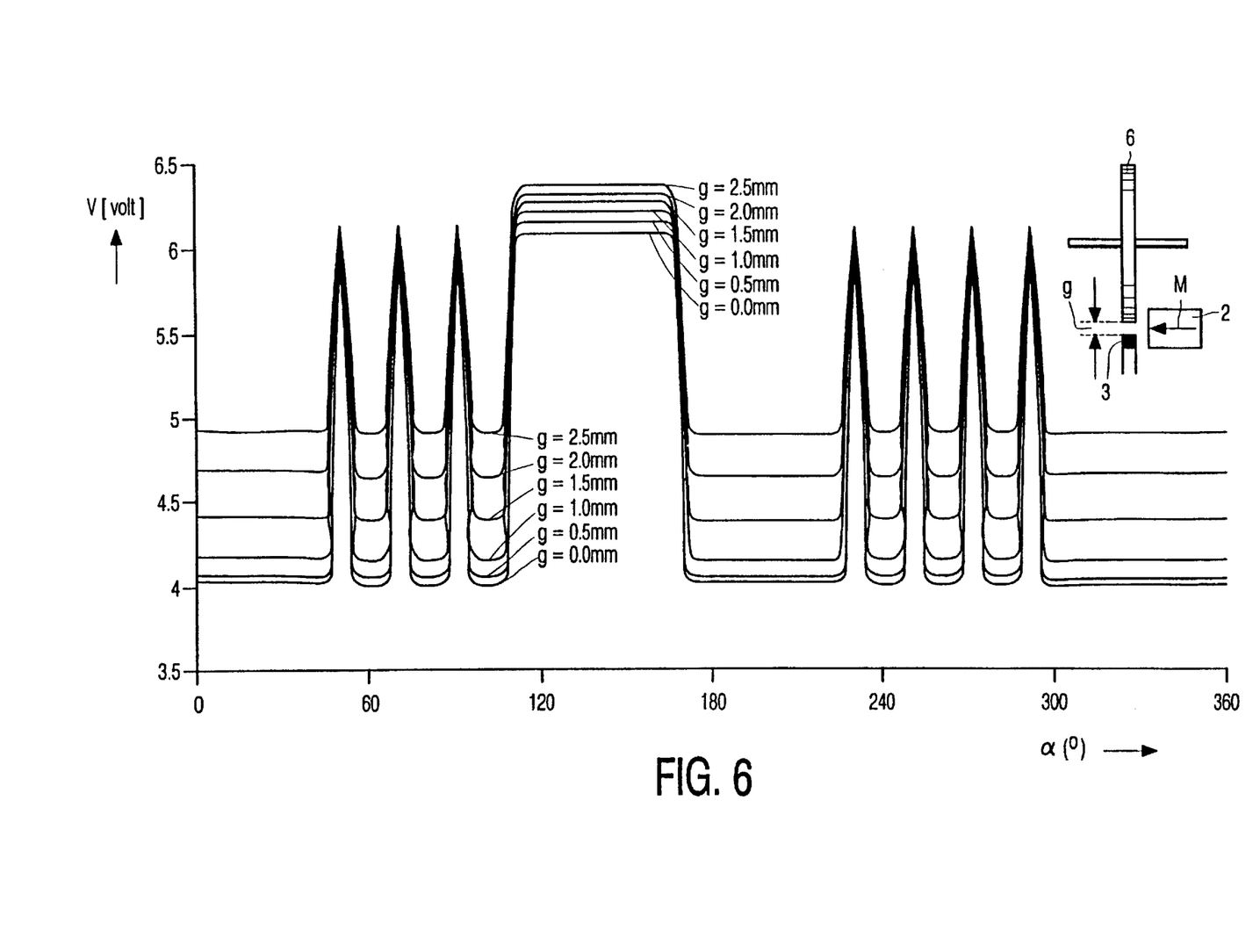

3$^{rd}$ Embodiment (FIG. 6)

Now the magnetoresistive sensor (3) is positioned facing the circumference (6) of the target wheel (1) as shown in the upper right part of FIG. 6. The magnet (2) is positioned facing a side of the target wheel with one of its poles pointing towards the tooth/slot pattern and the sensor. FIG. 6 also shows the output of an AMR sensor (KMZ10B) in this configuration. The angle over which the magnetisation direction of the sensor is changed depends on the position and size of the magnet, but is typically about 45 degrees. This can be measured both by an AMR or GMR sensor. Gap measure is denoted by "g".

Figure 7:
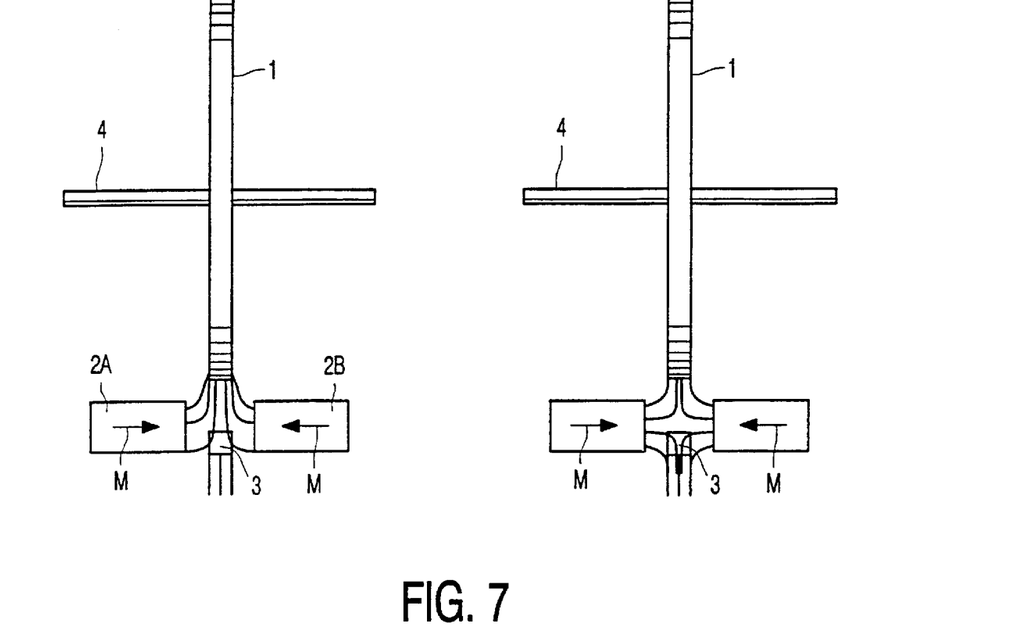

4$^{th}$ Embodiment (FIG. 7)

This embodiment is a variation on the third embodiment, specially suited for the use of one GMR sensor (3). GMR sensors can detect maximum changes in the magnetisation direction of 180 degrees, while an AMR sensor can only detect a rotation of the magnetisation direction over 90 degrees or less.

In this configuration, two magnets (2A, 2B) are used with opposite magnetisation direction with their poles pointing towards each other (see FIG. 7). The sensor and slot/tooth pattern of the target wheel 1 are positioned in between these two magnets in such a way that the maximum change in direction of the magnetic field in the sensor is 180 degrees during rotation of the target. With two AlNiCo magnets spaced at 16 mm, the magnetic field in the radial direction can be switched from about –100 Gauss to 100 Gauss, which is sufficient to saturate most GMR sensors in these opposite directions. FIG. 7 left shows the situation with the sensors facing a tooth, and FIG. 7 right with the sensor 3 facing a slot.

Figure 8:
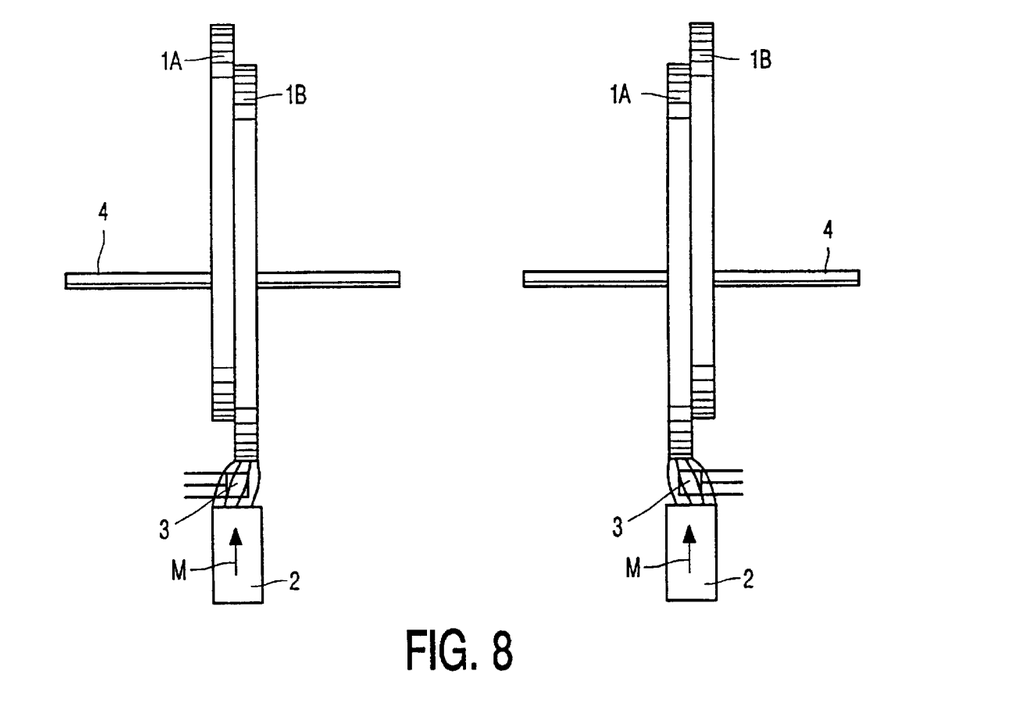

5$^{th}$ Embodiment (FIG. 8)

The set-up is used in combination with a complementary set of targets (1A, 1B). The AMR/GMR sensor 3 is positioned facing the circumference of the target wheel, centered with respect to both targets (1A, 1B), with a permanent magnet 2 behind the sensor 3 (as seen from the shaft 4, see FIG. 8). Because of the complementary tooth/slot patterns, the magnetic field from the magnet will be bended towards one of the two targets if the sensor 3 is not facing a gap/tooth transition in both targets. At a transition, the field in the sensor will not be bended and the sensor detects a magnetisation angle of 0 degree. This works both for complementary targets connected together and for targets separated by a non-magnetic spacing. In the latter case, the angle modulation and consequently the output modulation, can be larger, but the detection of the gap-tooth transition may be more sensitive to axial tolerances.

Figure 9:
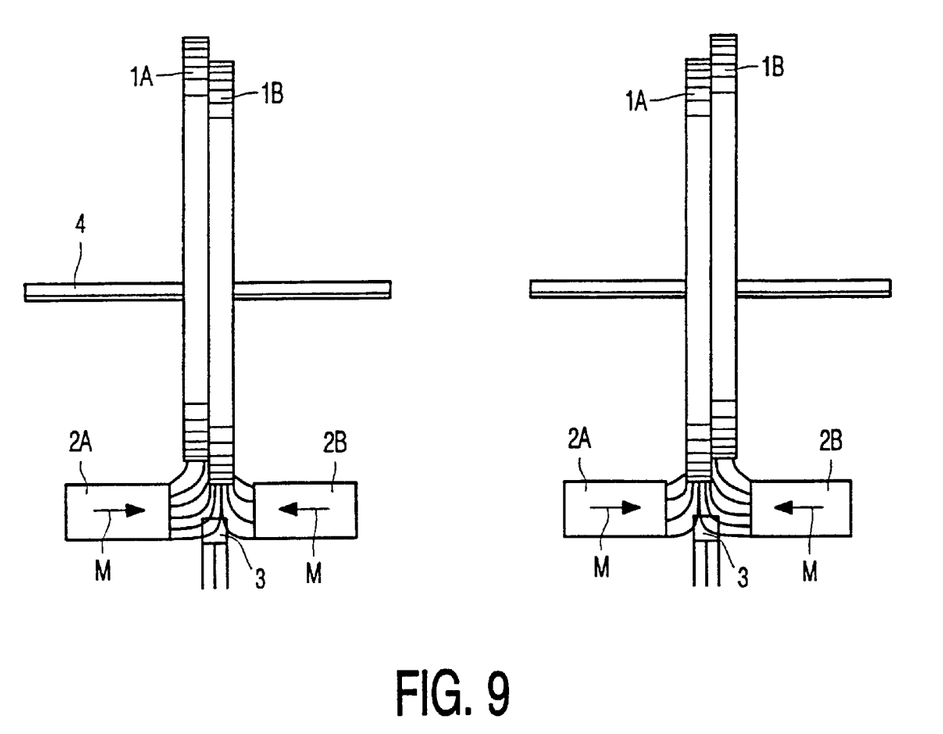

6$^{th}$ Embodiment (FIG. 9)

This embodiment uses two magnets 2A, 2B, positioned as in embodiment 4. It is especially suited for use with GMR sensors. The idea is that the two opposing magnetic fields will be attracted by one of the two targets, being the target that has a tooth in between the two magnets. So, the field direction above the junction of the two targets, or in front of the non-magnetic spacing between the two targets, changes by about 180 degrees if the targets are rotated.

7$^{th}$ Embodiment

Figure 10:
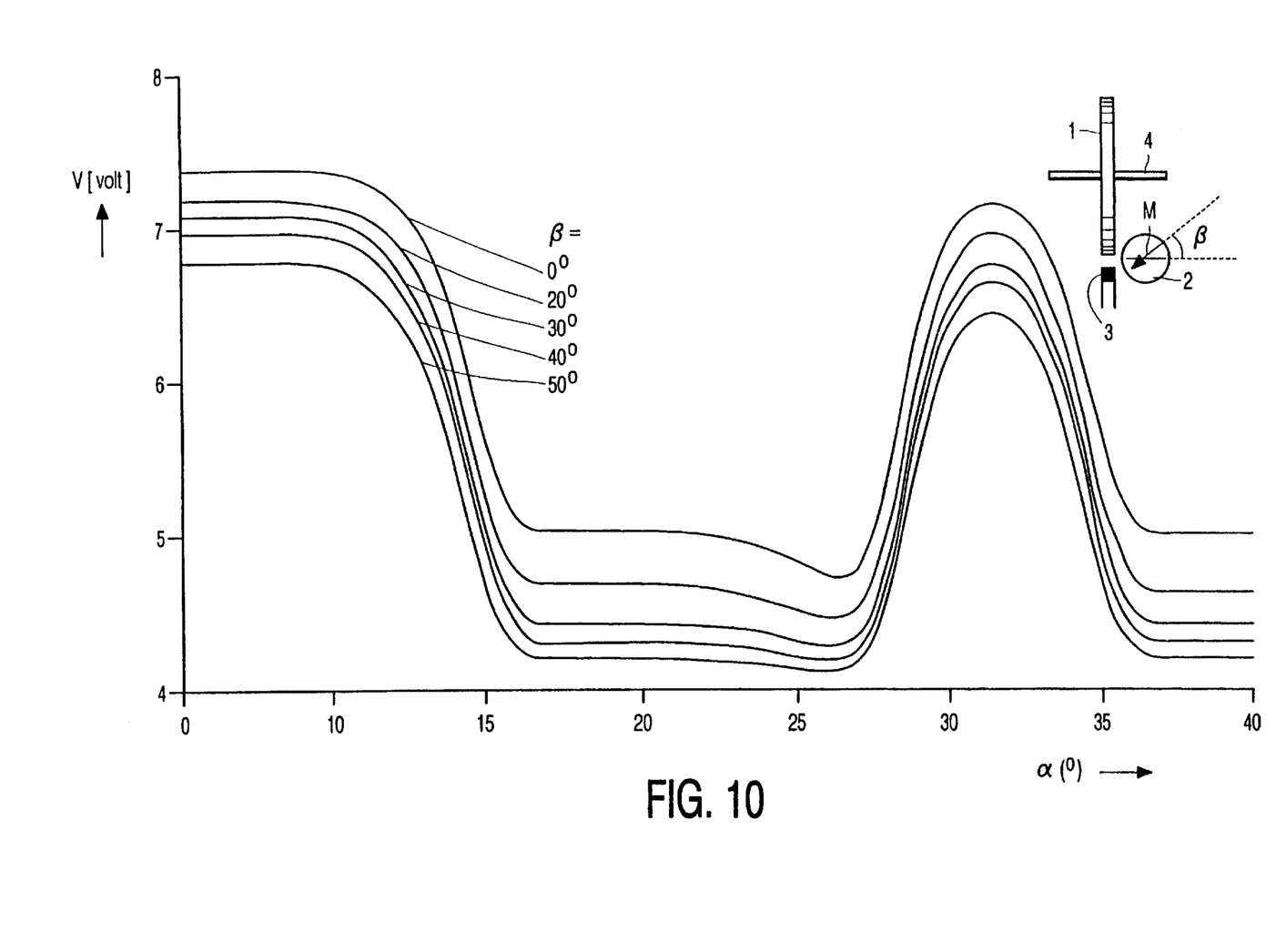
FIG. 10 shows an embodiment with a rotatable magnet.

In the embodiment shown in the upper part of FIG. 10 the sensor is positioned at the circumference of the target wheel as in embodiment 3. The magnet is positioned next to the target wheel, facing both the tooth/slot pattern of the wheel and the sensor. The magnet can be rotated which affects the output curves as can be seen in FIG. 10. This rotation can be used to tune the output signal of the complete detector configuration in the final stage of the assembly to the desired trigger position of the target track. In this way, differences between position sensors caused by assembly tolerances or by tolerances in the magnetic sensor or in the magnet can be reduced. A round magnet can be used to facilitate rotation within the housing (not shown) of the magnet and the magnetic sensor.

Referring in particular, but not exclusively, to FIG. 10, it is noted that the output signal is usually converted to a two-level digital signal by setting a first voltage trigger level for the positive slopes of the output curves and a second voltage trigger level slightly below the first trigger level for the negative slopes of the output curves. At the first trigger voltage the digital output switches from one level to the other. At the second trigger level the digital output switches back. The voltage trigger levels of the magnetic sensors are usually fixed. For Wheatstone bridge MR sensors like Philips KMZ10B the trigger level is preferably set close to a level which corresponds to zero output voltage across the sensor bridge, since this set point is the least dependent on temperature.

Figure 11:
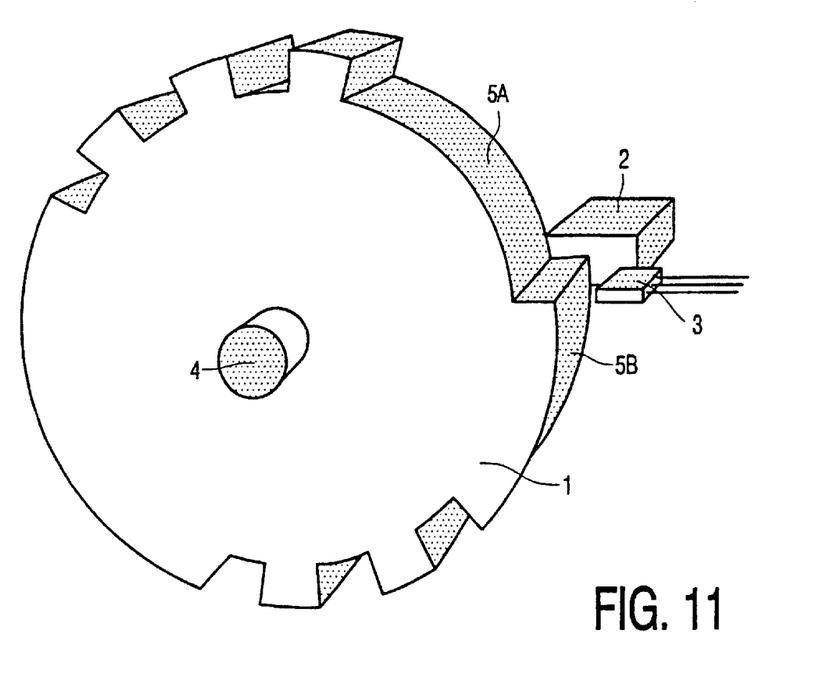
FIGS. 11 and 12 show perspective views of a target wheel in different positions with respect to a magnet/sensor combination.
Figure 12:
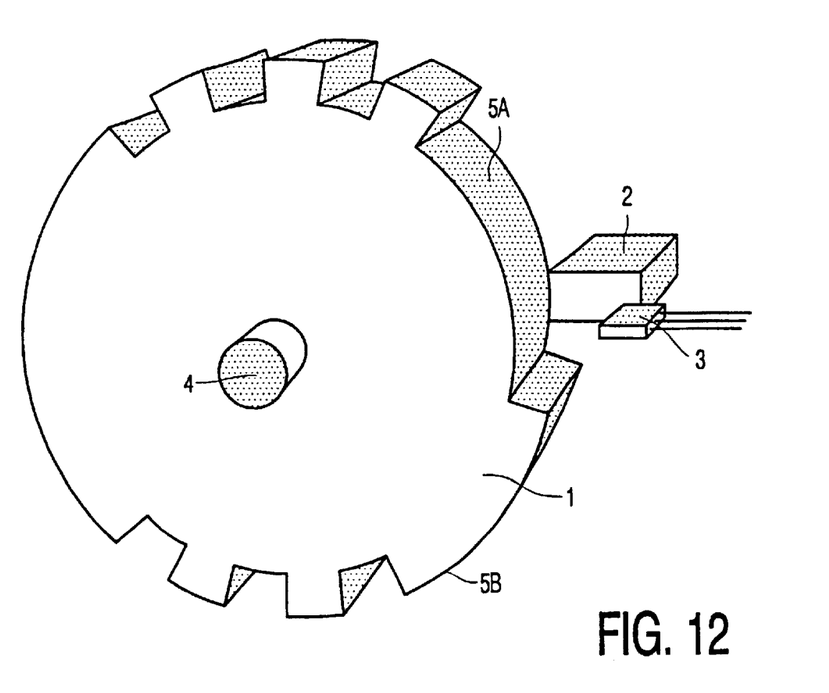

FIGS. 11 and 12 show perspective views of a target wheel 1 in two different positions with respect to the combination of a bias magnet 2 and a magnetoresistive sensor 3. In this case magnet 2 of the combination is arranged partly opposite to one of the two main surfaces of the target wheel 1. In FIG. 11 a tooth 5B of the target wheel is facing sensor 3.

In FIG. 12 a slot 5A of the target wheel 1 is facing sensor 3.

In short, the invention relates to a magnetic position detector comprising a soft magnetic target wheel, a magnetic sensor and a permanent magnet. The invention relates in particular to sensors of the magnetoresistive type in several geometrical configurations of the target wheel, the sensor and the magnet. All configurations result in a big change of the direction of the magnetic field at the location of the sensor as a result of a rotation of the target wheel. The configurations have in common that the direction of the magnetic field at the position of the sensor, as generated by the permanent magnet, is predominantly in the plane of the sensor surface, both when the sensor is next to a slot and next to a tooth of the target wheel, the surface of the sensor being substantially normal to the direction of movement of the target wheel.

I claim:

1. Magnetic position detector, comprising
    a moveable object having a magnetic target track comprising magnetic data of a first kind and a second kind disposed thereon,
    a magnetically sensitive component disposed proximate the target track,
    a biasing magnet disposed proximate and separated from the magnetically sensitive component,
wherein the magnetically sensitive component is a planar magneto resistive sensor, arranged such that the direction of magnetic bias field at the location of the sensor, as generated by the biasing magnet, is predominantly in the plane of the sensor surface, a magnetic datum of the first kind, when facing the sensor, causing the flow of magnetic flux in a first direction through the plane of the sensor, a magnetic datum of the second kind, when facing the sensor, causing the flow of magnetic flux in a second direction through the plane of the sensor, said sensor having an output signal representative of the direction of the magnetic flux flowing through it, wherein the number of biasing magnets and magnetically sensitive components comprise a one-to-one ratio, and wherein the sensor is insensitive to gap changes in the target track.

2. Detector as claimed in claim 1, characterized in that the sensor surface is substantially normal to the direction of movement of the moveable object.

3. Detector as claimed in claim 1, characterized in that the magnetoresistive sensor is arranged facing a side of the moveable object, proximate to the magnetic target track, the biasing magnet being positioned behind the sensor as seen from the moveable object.

4. Detector as claimed in claim 1, characterized in that two magnetoresistive sensors are arranged each facing one of two opposite sides of the moveable object, proximate to the magnetic target track.

5. Detector as claimed in claim 1, characterized in that the magnetoresistive sensor is arranged facing the circumference of the moveable object, the biasing magnet being positioned simultaneously facing a side of the moveable object and a side of the sensor.

6. Detector as claimed in claim 1, characterized in that the sensor is arranged facing the circumference of the moveable object, the biasing magnet being positioned simultaneously facing a side of the moveable object and a side of the sensor and having a first magnetisation direction, a further biasing magnet being positioned simultaneously facing the opposite side of the moveable object and the opposite side of the sensor, said further biasing magnet having an opposite magnetisation direction.

7. Detector as claimed in claim 1, characterized in that the moveable object has connected to the target track a complementary target track, the target tracks arranged in general parallel association with each other, the sensor being arranged facing the circumference of the moveable object, centered with respect to the target tracks, the biasing magnet being positioned behind the sensor as seen from the moveable object.

8. Detector as claimed in claim 1, characterized in that the moveable object has connected to the first target track a complementary target track, the target tracks in general parallel association with each other, the sensor being arranged facing the circumference of the moveable object, centred with respect to the target tracks, the biasing magnet being positioned simultaneously facing one side of the moveable object and a side of the sensor, a further biasing magnet being positioned simultaneously facing the opposite side of the moveable object and the opposite side of the sensor, the biasing magnets having opposing magnetisation directions.

* * * * *